United States Patent
Okita et al.

(10) Patent No.: US 11,391,985 B2
(45) Date of Patent: Jul. 19, 2022

(54) DISPLAY DEVICE AND ELECTRONIC DEVICE

(71) Applicant: Japan Display Inc., Tokyo (JP)

(72) Inventors: Mitsutaka Okita, Tokyo (JP); Shinichi Komura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/218,532

(22) Filed: Mar. 31, 2021

(65) Prior Publication Data

US 2021/0311357 A1  Oct. 7, 2021

(30) Foreign Application Priority Data

Apr. 3, 2020 (JP) .............................. JP2020-067890

(51) Int. Cl.
*G02F 1/1335* (2006.01)
*H04N 5/225* (2006.01)

(52) U.S. Cl.
CPC .. *G02F 1/133531* (2021.01); *G02F 1/133548* (2021.01); *G02F 2203/11* (2013.01); *H04N 5/2257* (2013.01)

(58) Field of Classification Search
None
See application file for complete search history.

(56) References Cited

U.S. PATENT DOCUMENTS

2011/0013117 A1*  1/2011  Egi .................. G02F 1/133528
349/62

FOREIGN PATENT DOCUMENTS

CN       110441953 A   * 11/2019
JP       2010-015015 A    1/2010

* cited by examiner

*Primary Examiner* — Phu Vu
(74) *Attorney, Agent, or Firm* — Oblon, McClelland, Maier & Neustadt, L.L.P.

(57) ABSTRACT

A display device includes a first substrate including a first surface and a second surface on the opposite side with respect to the first surface, a second surface having a third surface opposite the first surface and a fourth surface on the opposite side with respect to the third surface, and a liquid crystal layer disposed between the first substrate and the second substrate, the display device includes a first region and a second region in a plan view, the first substrate includes a first polarizer provided on the second surface and a second polarizer being overlapped with the second region and being laminated with the first polarizer, and the second substrate includes a third polarizer provided on the fourth surface and a fourth polarizer being overlapped with the second region and being laminated with the third polarizer.

7 Claims, 11 Drawing Sheets

DISPLAY DEVICE AND ELECTRONIC DEVICE

This application is based upon and claims the benefit of priority from the prior Japanese Patent Application No. 2020-67890, filed on Apr. 3, 2020, and the entire contents of which are incorporated herein by reference.

FIELD

An embodiment of the present invention relates to a display device and an electronic device.

BACKGROUND

Currently, one of the most widely used display devices is a liquid crystal display device. For example, a liquid crystal display device is widely used not only for a television, but also as an interface for various electronic devices such as a computer, a tablet device, or a mobile phone.

Recently, many small portable electronic terminals are designed so that regions (frame region and peripheral region) other than a display surface are as narrow as possible in order to improve the display visibility and improve the design by increasing the display surface. This design guideline strictly limits regions required for devices that support the functions of electronic terminals such as an imaging device, a sensor, and an audio input/output device. For this reason, it has been proposed to provide a notch or an opening in a part of the display surface and place an image sensor or a sensor in it. For example, Japanese Unexamined Patent Application Publication No. 2010-15015 discloses that a light transmittance region is formed on a part of a display surface by configuring a display device so that a part of the display surface is structured or driven differently from other parts. By utilizing this light transmittance region, it is possible to arrange various elements in a position overlapping the display surface.

SUMMARY

A display device according to an embodiment in the present invention includes a first substrate having a first surface and a second surface on the opposite side with respect to the first surface, a second substrate having a third surface opposite the first surface and a fourth surface on the opposite side with respect to the third surface, and a liquid crystal layer disposed between the first substrate and the second substrate. The display device includes a first region and a second region in a plan view. The first substrate includes a first polarizer provided on the second surface and a second polarizer being overlapped with the second region and being laminated with the first polarizer. The second substrate includes a third polarizer provided on the fourth surface and a fourth polarizer being overlapped with the second region and being laminated with the third polarizer.

An electronic equipment according to an embodiment according in the present invention includes the display device and an image sensor that is installed outside the display device and is overlapped on the second region.

DESCRIPTION OF EMBODIMENTS

Figure 1:
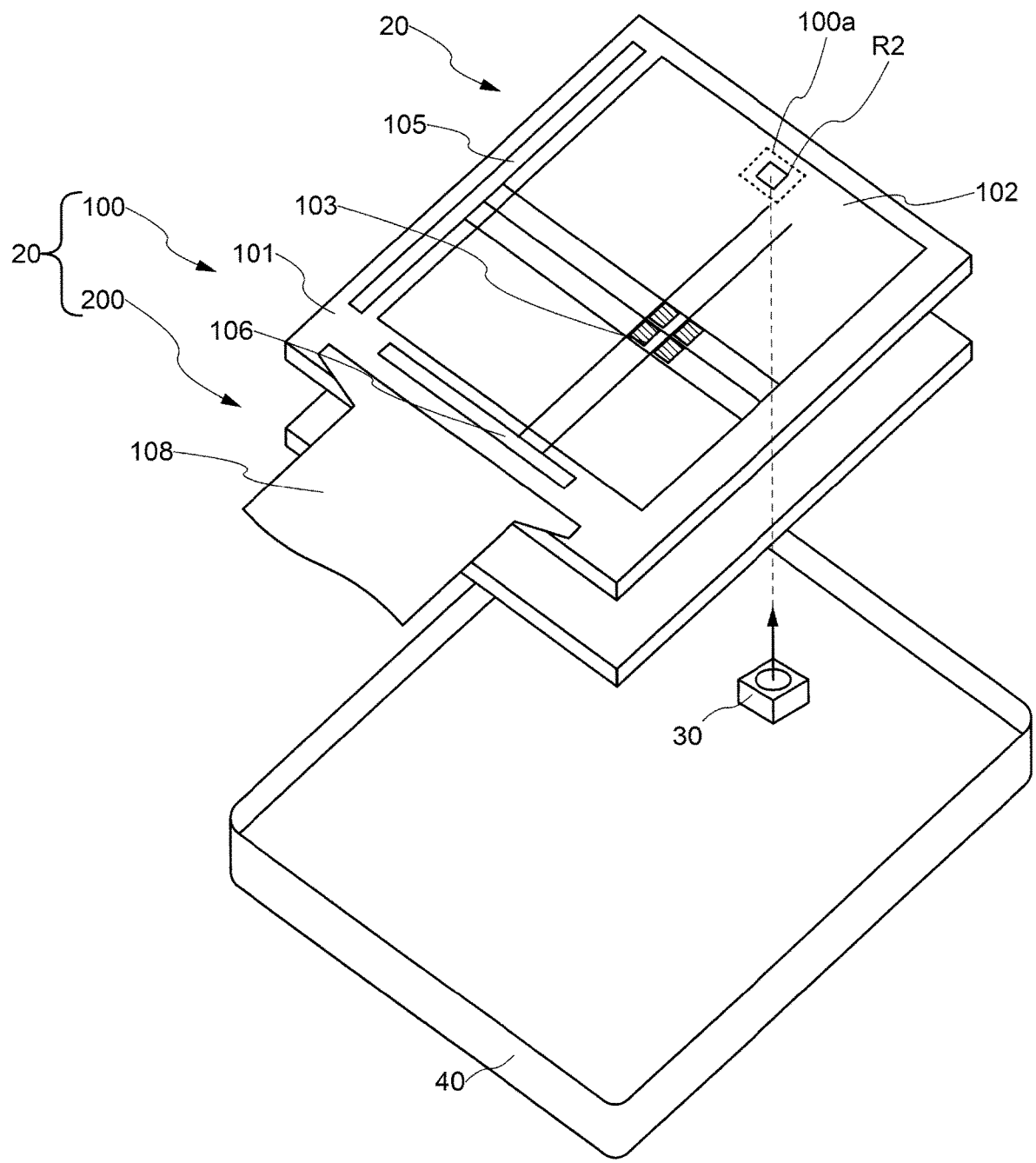
FIG. 1 is a perspective view showing a display device according to an embodiment of the present invention.

Embodiments of the present invention will be described below referring to the drawings. The disclosure is merely an example, and the disclosure which those skilled in the art can easily conceive appropriate changes while maintaining the gist of the invention are naturally included in the scope of the invention. For the sake of clarity of explanation, the drawing may be schematically represented with respect to a width, a thickness, a shape, and the like of the respective portions in comparison with actual embodiments but are merely an example and do not limit the interpretation of the present invention. In this specification and each of the drawings, the same reference numerals (or reference numerals denoted by A, B, and the like) are given to the same elements as those described above referring to the preceding drawings, and detailed description thereof may be omitted as appropriate. In addition, the letters "first" and "second" to each element are convenient labels used to distinguish each element and have no further meaning unless otherwise stated.

In the detailed description of the present invention, in defining the positional relationship between one component and another component, the terms "above" and "below" include not only the case of being positioned directly above or below one component, but also the case of interposing another component therebetween, unless otherwise specified.

In a display device, a polarizer is used to control the transmission of light. The polarizer has different contrast ratios when transmitting light in each wavelength band depending on the material used. For example, if the light transmitted through a display region is visible light and the light passing through a region overlapped with an image sensor is infrared light, the wavelength band of the light required in each region is different. Therefore, when a polarizer being used for the display region is used, in the region overlapped with the image sensor it is not possible to obtain an image with an appropriate contrast ratio.

The present disclosure provides a display device with a high display quality having a high contrast ratio in a wide wavelength band.

First Embodiment (1-1. Configuration of Electronic Equipment and Display Device)

Hereinafter, an electronic equipment according to the present embodiment will be described. FIG. 1 is a perspective view showing main components of an electronic equipment 10 according to an embodiment of the present invention. The electronic equipment 10 includes a display device 20, an image sensor 30, and a housing 40. The display device 20 is configured to include a display panel 100 and a lighting device 200. The display panel 100 is disposed on the front (top) side of the lighting device 200. The lighting device 200 illuminates the display panel 100 from the back of the display panel 100.

The image sensor 30 is arranged on the back of the display panel 100 and the lighting device 200. The image sensor 30 is arranged to overlap with a part of a region of the display panel 100 and the lighting device 200. Specifically, the image sensor 30 is overlapped with on an infrared light transmission region R2 of the display panel 100. On the image sensor 30, the lighting device 200 may not be arranged. In this case, the image sensor 30 may have an infrared light source. The image sensor 30 emits infrared light and receives the infrared light reflected by an object. In this case, infrared light used in the image sensor 30 also includes light in the near infrared region and far infrared region.

Figure 2:
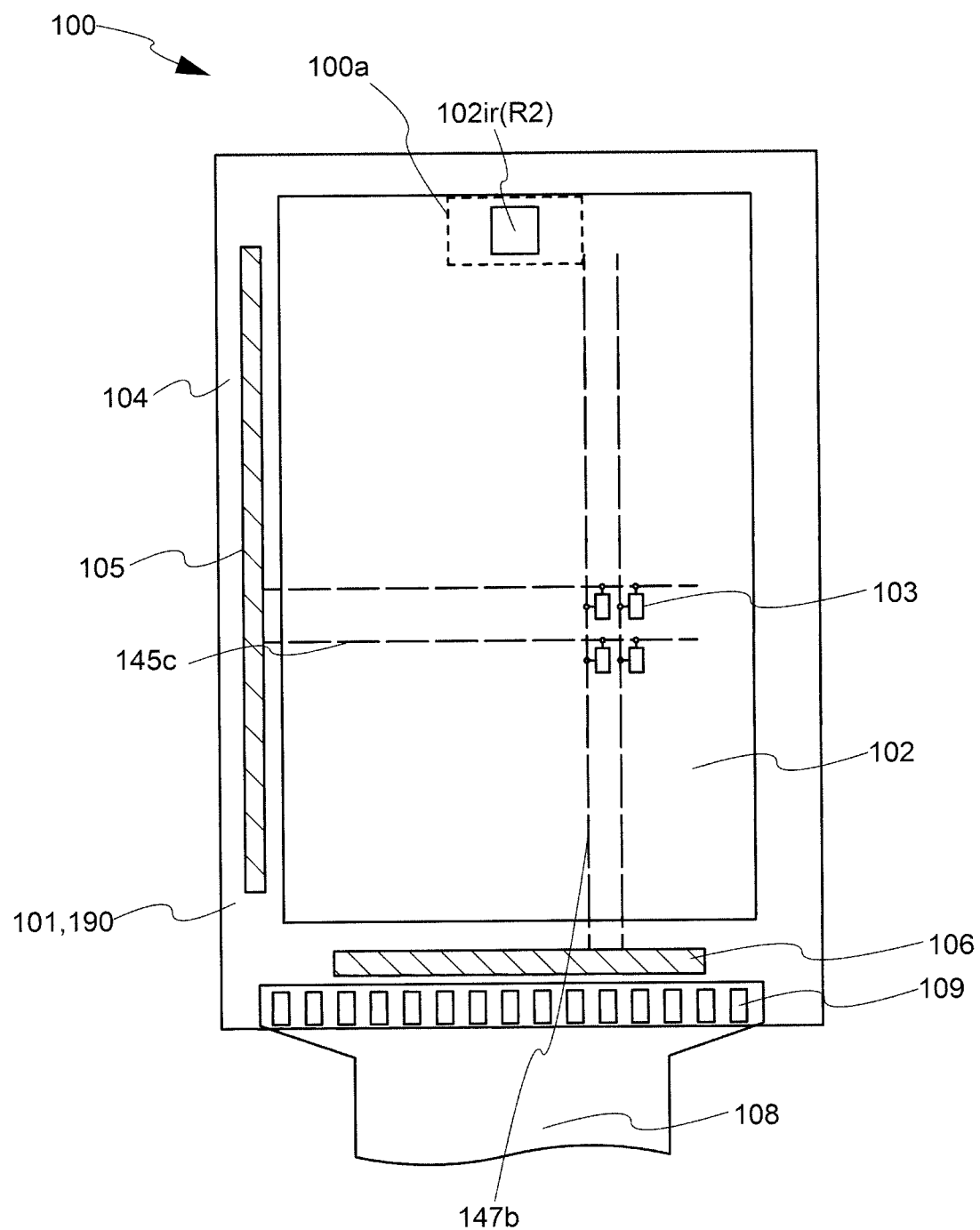
FIG. 2 is a top view showing a display device according to an embodiment of the present invention.

FIG. 2 is a top view of the display panel 100. The display panel 100 includes a second substrate 101, a display region 102, a pixel 103, a peripheral region 104, a drive circuit 105, a drive circuit 106, a flexible printed circuit 108, a terminal section 109, and a first substrate 190. In the display region 102, each of a plurality of pixels 103 is arranged apart in a lattice pattern. The pixel 103 functions as a component of an image. Specifically, the pixel 103 includes a display element 130 which will be described later. The display element 130 has a function of transmitting or blocking light. The peripheral region 104 is provided so as to surround the display region 102. The drive circuit 105 is provided in the peripheral region 104 and has a function as a gate driver. The drive circuit 106 is provided in the peripheral region 104 and has a function as a source driver. A scan line 145c is connected to the drive circuit 105. A signal line 147b is connected to the drive circuit 106. The pixel 103 is connected to the scan line 145c and the signal line 147b.

In the display panel 100, a display control signal is entered into the drive circuit 105 and the drive circuit 106 via the flexible printed circuit 108 from an external control device (not shown). In this case, a scan signal from the drive circuit 105 is transmitted to the pixel 103 in the display region 102 via the scan line 145c. Similarly, a video signal from the drive circuit 106 is transmitted to the pixel 103 in the display region 102 via the signal line 147b. In this case, from each of pixels 103, any light in the visible wavelength band is obtained. As a result, a still image and a moving image using light in the visible wavelength band are displayed on the display region 102.

(1-2. Configuration of Display Region and Infrared Light Transmission Region)

Figure 3:
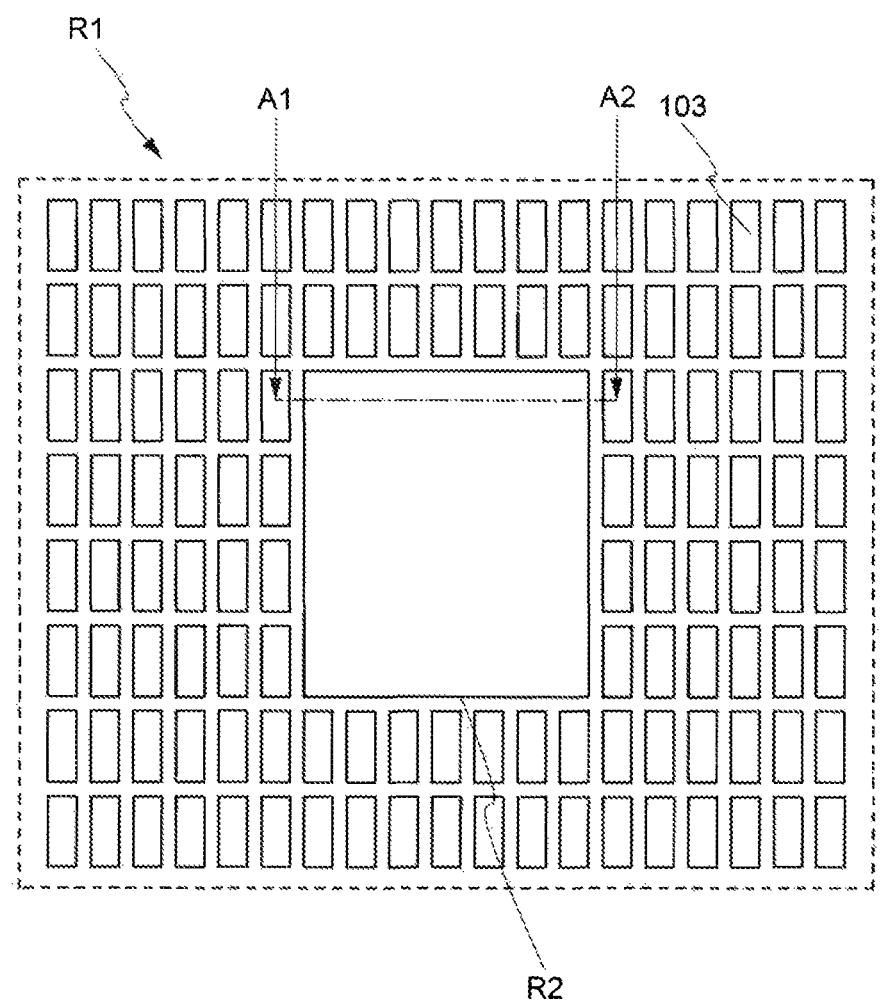
FIG. 3 is an enlarged top view of a part of a display region in a display device according to an embodiment of the present invention.

FIG. 3 is an enlarged top view of a region 100a in a part of the display device. As shown in FIGS. 2 and 3, in the display region 102, the infrared light transmission region R2 (also referred to as a second region) in a part of an image display region R1 (also referred to as a first region). Therefore, the infrared light transmission region R2 is surrounded by the image display region R1. In the present embodiment, the infrared light transmission region R2 is a region for displaying light in the infrared wavelength band. The infrared light transmission region R2 has a square region with a length of 1 mm or more and 10 mm or less on one side. In this example, the infrared light transmission region R2 has a square region with a side length of 5 mm. The infrared light transmission region R2 is not limited to squares and may have a circular or elliptical region with the diameter of 1 mm or more and 10 mm or less. In the present embodiment, all four sides of the infrared light transmission region R2 are surrounded by the image display region R1, but at least one side may be adjacent to each other via a light shielding region.

Figure 4:
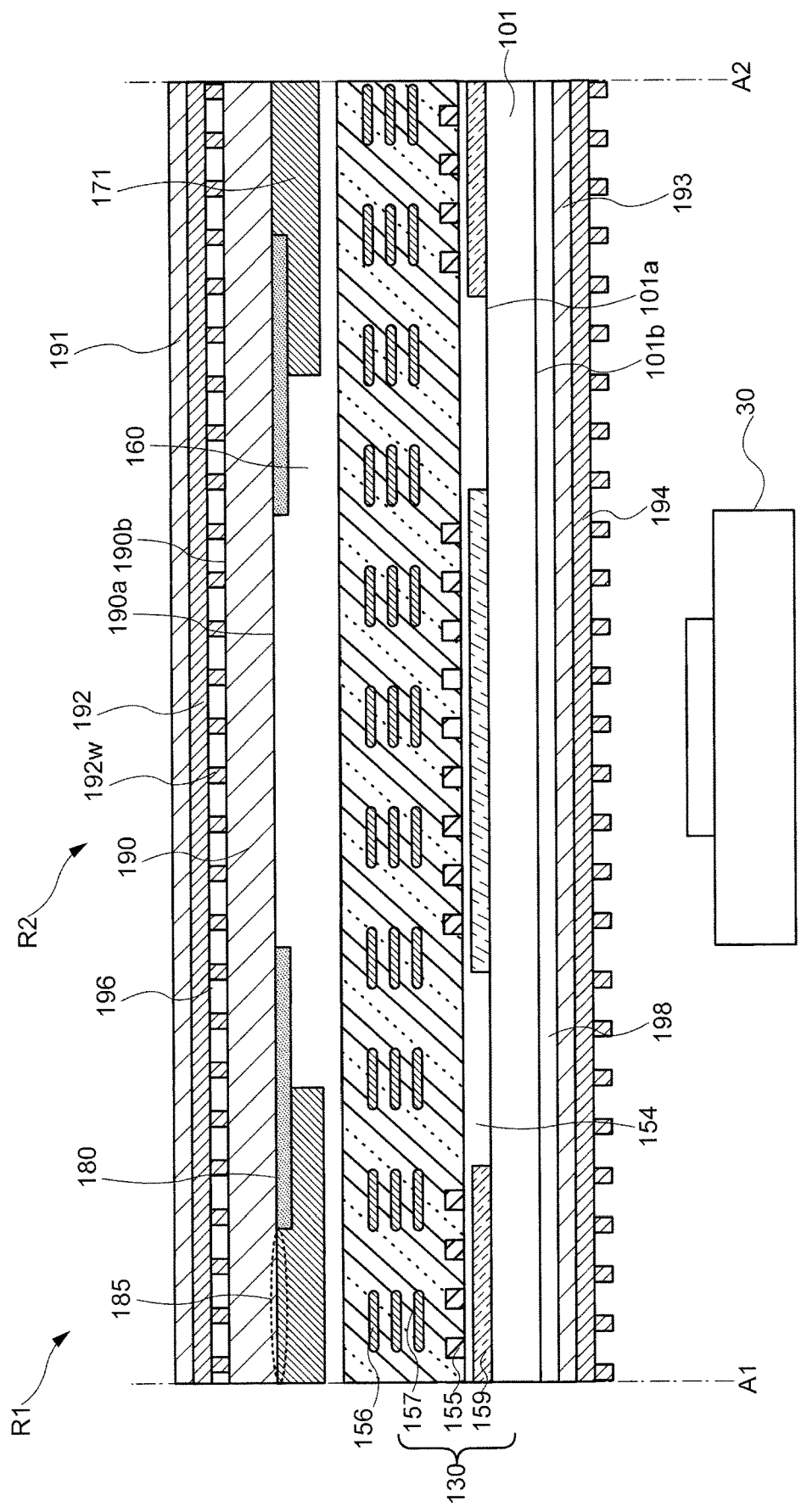
FIG. 4 is a cross-sectional view showing a display region in a display device according to an embodiment of the present invention.

FIG. 4 shows a cross-sectional view between A1-A2 of the region 100a. The cross-sectional view in FIG. 4 is a cross-sectional view taken along the direction in which the gate line extends. The display panel 100 includes the second substrate 101, the display element 130 (a pixel electrode 155, a liquid crystal layer 157, a common electrode 159), a color material 171, a light shielding layer 180, the first substrate 190, a first polarizer 191, a second polarizer 192, a third polarizer 193, and a fourth polarizer 194. As shown in FIG. 4, the image display region R1 (the first region R1) and the infrared light transmission region R2 (the second region R2) are provided between the second substrate 101 and the first substrate 190. More specifically, the display region 102 and the infrared light transmission region R2 are provided between a first surface 101a of the second substrate 101 and a first surface 190a of the first substrate 190.

The second substrate 101 and the first substrate 190 are arranged to face each other. The second substrate 101 and the first substrate 190 have a function of transmitting light. For example, the second substrate 101 and the first substrate 190 may be made of an inorganic insulating material, an organic insulating material, or a mixed material of an inorganic insulating material and an organic insulating material having light transmittance. Specifically, a glass substrate is used for the second substrate 101 and the first substrate 190. Preferably, the second substrate 101 and the first substrate 190 are thick enough to have rigidity. Specifically, the thickness of the second substrate 101 and the first substrate 190 is preferably 100 μm or more and 1000 μm or less.

Although an example is shown in which the second substrate 101 and the first substrate 190 have rigidity, the present invention is not limited thereto. For example, the second substrate 101 and the first substrate 190 may have flexibility. In this case, an organic resin material may be used for the second substrate 101 and the first substrate 190. Specifically, a polyimide resin may be used for the second substrate 101 and the first substrate 190.

A transistor, a capacitive element, a wiring, and the like are provided in the second substrate 101. Details of the elements will be described below.

The pixel electrode 155, the liquid crystal layer 157, and the common electrode 159 are used for the display element 130. That is, the display element 130 can be said to be a liquid crystal device. The display element 130 has a function of transmitting or blocking light emitted by the lighting device 200 to the first substrate 190 side. As a result, in the infrared light transmission region R2, the display element 130 can function as a shutter of the image sensor 30, as described later.

The pixel electrode 155 is provided for each pixel 103 on the second substrate 101 side (specifically, on the first surface 101a side of the second substrate 101). In the present embodiment, the pixel electrode 155 is provided in a comb teeth shape. The pixel electrode 155 has a function as a first electrode of the display element 130. A conductive material having light transmittance is used for the pixel electrode 155. For example, an oxide conductive material such as ITO and IZO are used for the pixel electrode 155.

The common electrode 159 is provided on the second substrate 101 side. The common electrode 159 functions as a second electrode of the display element 130. The common electrode 159 is provided so as to overlap with a plurality of pixel electrodes 155 via an insulating layer 154 for each pixel 103. The common electrode 159 includes a material having light transmittance and conductivity. For example, an oxide conductive material such as ITO and IZO are used for the common electrode 159. The arrangement of the common electrode 159 may be adjusted as appropriate.

The liquid crystal layer 157 is provided between the second substrate 101 and the first substrate 190 (specifically, between the insulating layer 154 and a resin layer 160). A most suitable liquid crystal molecule 156 is used for the liquid crystal layer 157 as appropriate. In this example, an IPS (In Plane Switching) type liquid crystal element is used as the display element 130. In the present embodiment, a TN (Twist Nematic) liquid crystal element or a VA (Vertical Alignment) liquid crystal element may be used. In the IPS type liquid crystal element, the orientation of the liquid crystal molecule 156 is controlled by lateral electric field generated by the pixel electrode 155 and the common electrode 159.

Although not described in the present embodiment, an orientation film may be provided between the pixel electrode 155 and the liquid crystal layer 157, and between the resin layer 160 and the liquid crystal layer 157.

The light shielding layer 180 is provided on the first substrate 190 (the first surface 190a of the first substrate 190). The light shielding layer 180 has an opening 185 in a lattice pattern. The light shielding layer 180 has the function of blocking light from being irradiated to the first substrate 190 sides. The light shielding layer 180 includes a non-light transmittance resin material. For example, a black resin material (e.g., a polyimide resin) may be used for the light shielding layer 180.

The color material 171 is provided on the first substrate 190 and on an opening 185 of the light shielding layer 180. The color material 171 has a function of transmitting light of a specific wavelength band. Therefore, the color material 171 is also called a color filter. For example, a material that transmits light in a red wavelength band (specifically, a wavelength band of 610 nm to 750 nm) is used for the color material 171. Alternatively, as the color material 171, a material that transmits light in a green wavelength band (specifically, a wavelength band of 500 nm to 560 nm) is used. Alternatively, as the color material 171, a material that transmits light in a blue wavelength band (specifically, a wavelength band of 435 nm to 480 nm) is used.

In the infrared light transmission region R2, although not shown, a transparent resin material may be used instead of the color material 171.

The resin layer 160 is provided on the color material 171 and the light shielding layer 180. For the resin layer 160 (also referred to as an overcoat layer), a colorless transparent organic material or a composite material of a colorless transparent organic material and an inorganic material may be used. For example, an acrylic resin may be used for the resin layer 160.

The polarizer 191 (also referred to as the first polarizer) is provided on a second surface 190b side in the outside (visually recognized side) of the first substrate 190. The polarizer 193 (also referred to as the third polarizer) is provided on a second surface 101b side in the outside of the second substrate 101. The first polarizer 191 and the third polarizer 193 overlap with the image display region R1 and the infrared light transmission region R2. The first polarizer 191 and the third polarizer 193 have a function of improving the contrast ratio to the light in the visible wavelength band together with the function of polarizing the light in the visible wavelength band (also referred to as light in the first wavelength band). Specifically, the contrast ratio between the light having a peak wavelength at a wavelength of 550 nm and the light having a peak wavelength at a wavelength of 1200 nm by the first polarizer 191 and the third polarizer 193 is 4800:1.

The polarizer 192 (also referred to as the second polarizer) is provided on the second surface 190b of the first substrate 190. The polarizer 194 (also referred to as the fourth polarizer) is provided on the second surface 101b of the second substrate 101. In this example, the second polarizer 192 and the fourth polarizer 194 overlap with the image display region R1 and the infrared light transmission region R2. The second polarizer 192 and the fourth region 194 have a function of increasing the contrast ratio to the light in the infrared region together with the function of polarizing the light in the infrared wavelength band (also referred to as the light in the second wavelength band). The polarizer for polarizing the visible light used in the liquid crystal display device controls the polarization by the anisotropy of the light-absorption by iodine. On the other hand, iodine cannot control the absorptivity of electromagnetic waves in infrared wavelength band. If a metal wire is used, the absorption axis of infrared light can be controlled by the width and pitch of the metal wire. Specifically, the contrast ratio between the light having the peak wavelength at the wavelength of 550 nm and the light having the peak wavelength at the wavelength of 1200 nm by the second polarizer 192 and the fourth polarizer 194 is 450:800.

In the present embodiment, the second polarizer 192 is laminated with the first polarizer 191. Similarly, the fourth polarizer 194 is laminated with the third polarizer 193. In this case, the second polarizer 192 is arranged inner than the first polarizer 191 on the basis of the second surface 190b of the first substrate 190.

The second polarizer 192 and the fourth polarizer 194 include a metal wire 192w and a metal wire 194w provided in a grid pattern. The spacing between the metal wires in the second polarizer 192 and the fourth polarizer 194 is 100 nm to 150 nm. For example, an aluminum wire grid polarizer is used for the second polarizer 192 and the fourth polarizer 194.

In the present embodiment, the first polarizer 191 and the second polarizer 192 are provided in the same region. Similarly, the third polarizer 193 and the fourth polarizer 194 are provided in the same region. That is, the second polarizer 192 and the fourth polarizer 194 are provided to overlap with the image display region R1 and the infrared light transmission region R2.

The second polarizer 192 is bonded to the first substrate 190 and the first polarizer 191 via an adhesive 196. The third polarizer 193 is bonded to the second substrate 101 and the fourth polarizer 194 via an adhesive 198.

(1-3. Configuration of Polarizer and Transmission of Light)

Figure 5:
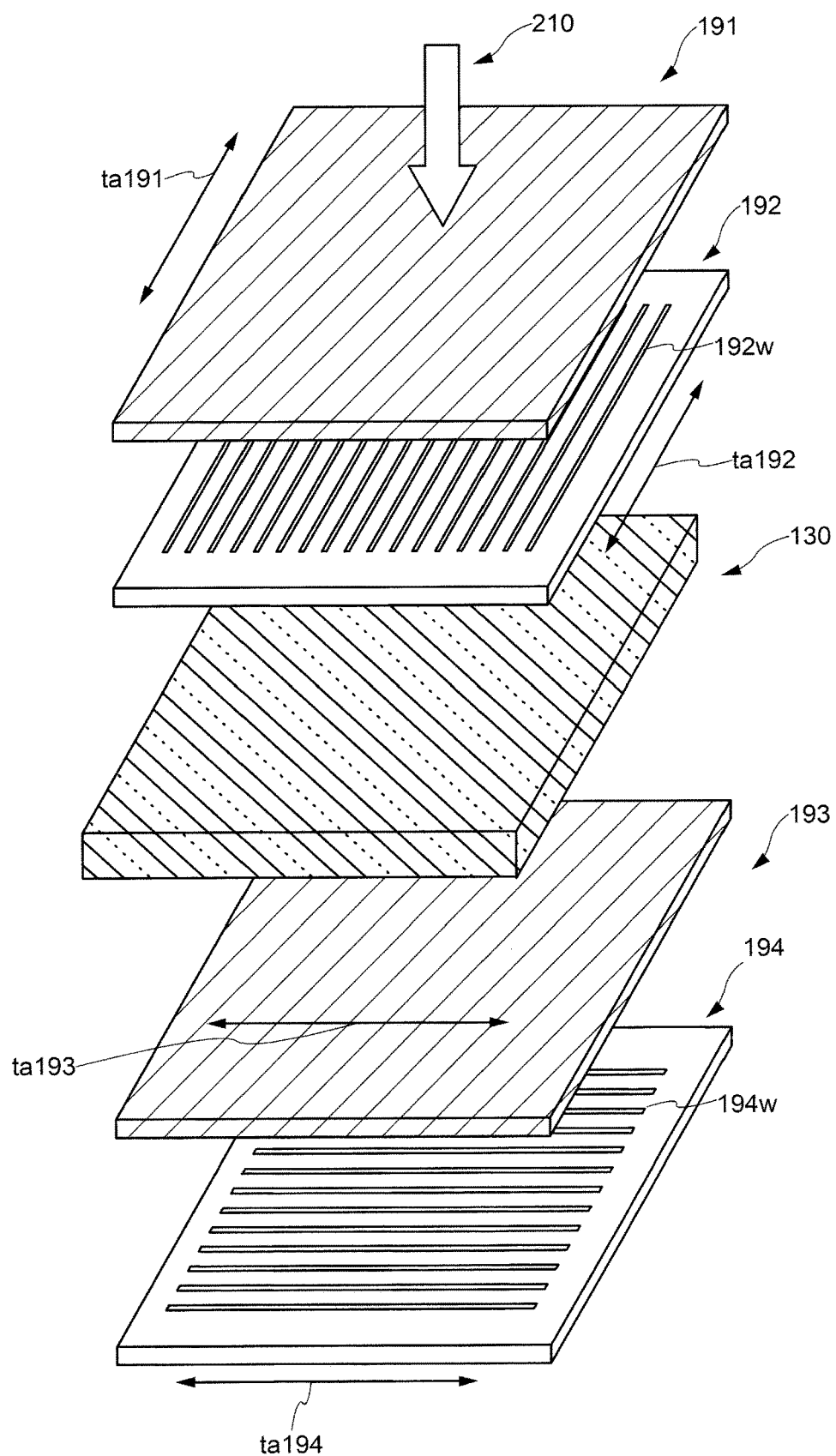
FIG. 5 is a perspective view showing a configuration of a polarizer according to an embodiment of the present invention.

FIG. 5 is a perspective view showing a configuration of a transmission axis of the polarizer. As shown in FIG. 5, in the present embodiment, a transmission axis ta191 of the first polarizer 191 for visible light and a transmission axis ta192 of the second polarizer 192 for infrared light are parallel. Similarly, a transmission axis ta193 of the third polarizer 193 for visible light and a transmission axis ta194 of the fourth polarizer 194 for infrared light are parallel. On the other hand, the transmission axis ta191 of the first polarizer 191 and the transmission axis ta193 of the third polarizer 193 via the display element 130 are orthogonal in accordance with the orientation control of the liquid crystal. Similarly, the transmission axis ta192 of the second polarizer 192 and the transmission axis ta194 of the fourth polarizer 194 via the display element 130 are orthogonal.

Figure 6:
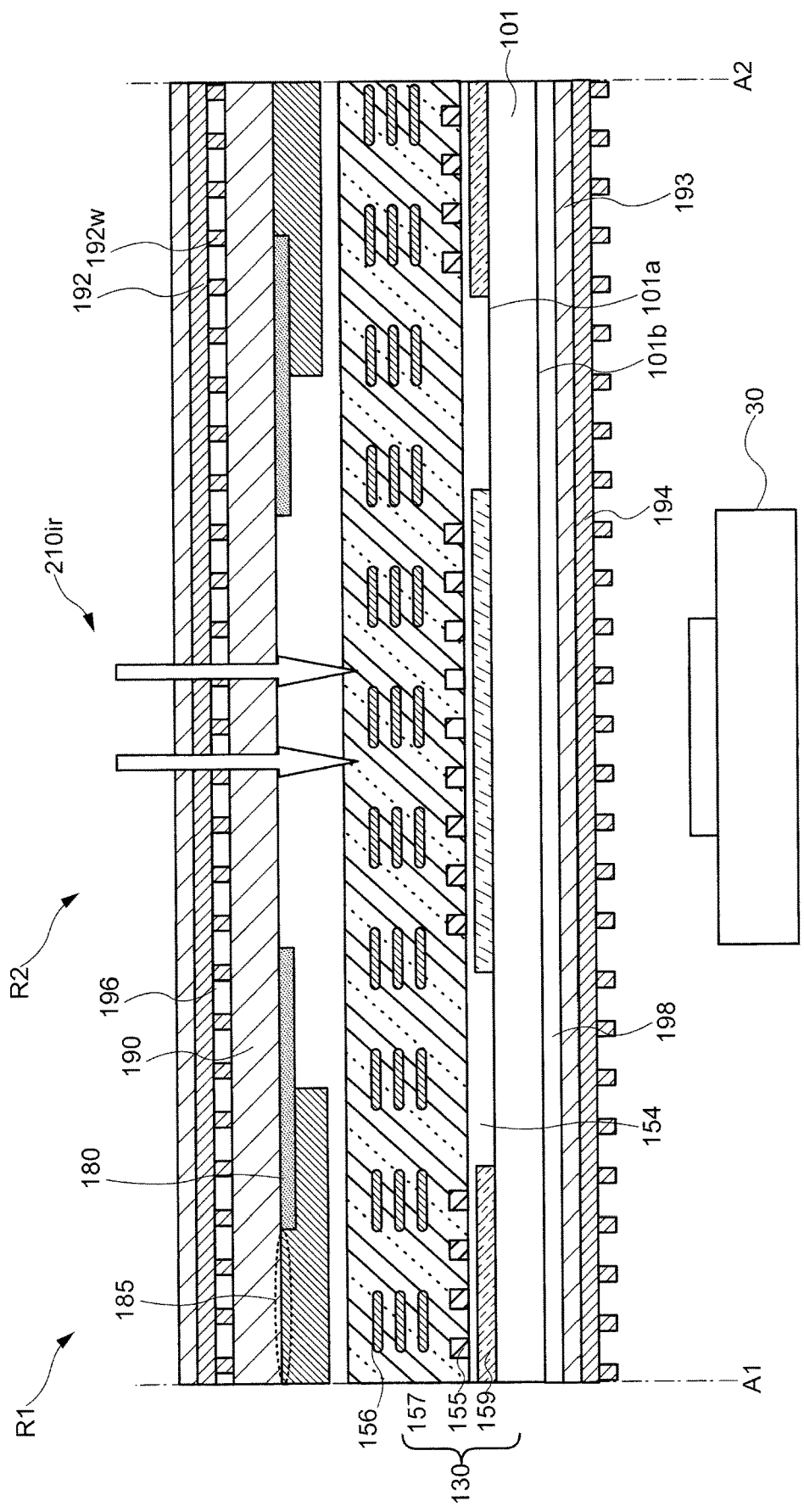
FIG. 6 is a cross-section showing an example of transmission of light in a display device according to an embodiment of the present invention.
Figure 7:
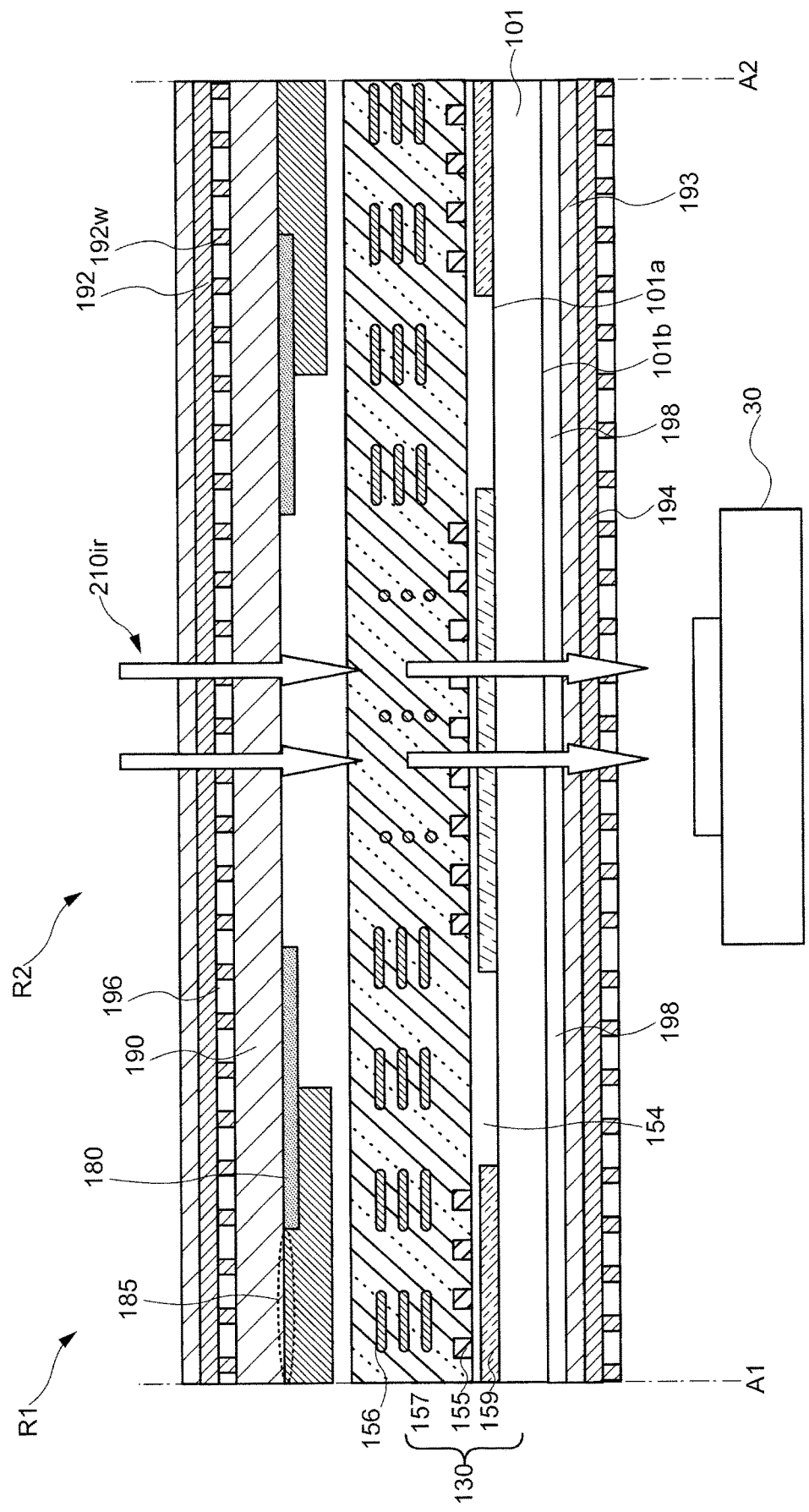
FIG. 7 is a cross-section showing an example of transmission of light in a display device according to an embodiment of the present invention.

FIG. 6 shows a state in which the infrared light in the infrared light transmission region R2 is blocked. FIG. 7 shows the transmission of infrared light in the infrared light transmission region R2. As shown in FIG. 6, infrared light 210ir is polarized by the second polarizer 192 without being subjected to a polarization control by the first polarizer 191. In this case, the orientation of the liquid crystal molecules 156 in the liquid crystal layer 157 is controlled so as to block the infrared light 210ir. Specifically, the orientation of the liquid crystal molecules 156 is controlled so that the oscillation direction of the infrared light 210ir being transmitted through the second polarizer 192 intersect (or are perpendicular to) the transmission axes of the fourth polarizer 194. As a result, the infrared light 210ir cannot transmit through the fourth polarizer 194 after passing through the liquid crystal layer 157. That is, the infrared light 210ir is blocked.

On the other hand, in the case shown in FIG. 7, the orientation of the liquid crystal molecule 156 is controlled so as to transmit the infrared light 210ir. Specifically, the orientation of the liquid crystal molecules 156 is controlled so that the oscillation direction of the infrared light 210ir transmitted through the second polarizer 192 is parallel to the transmission axis of the fourth polarizer 194. After passing through the liquid crystal layer 157, the infrared light 210ir can transmit through the fourth polarizer 194. That is, the infrared light 210ir is transmitted through the display panel 100. As described above, in the infrared light transmission region R2, the light in the infrared transmission wavelength band can be selectively transmitted by the second polarizer 192 and the fourth polarizer 194. Therefore, the contrast ratio in the infrared light transmission region R2 can be improved.

In the display region 102, by using the first polarizer 191 and the third polarizer 193, only visible light oscillating in a predetermined direction is transmitted. Therefore, in the display region 102, it is possible to increase the contrast ratio to the light in the visible wavelength band by the first polarizer 191 and the third polarizer 193.

Therefore, by using the present embodiment, a polarizer suitable for the light in the respective wavelength band functions. Therefore, it is possible to provide a display device with high display quality having a high contrast ratio while being able to polarize the light in a wide wavelength band.

In the present embodiment, the fourth polarizer 194 is arranged on outer of the second surface 101b in the second substrate 101 than the third polarizer 193. That is, the fourth polarizer 194 is arranged closer to the image sensor 30 than the third polarizer 193. In this case, the light which is not parallel to the transmission axis ta194 among the irradiated visible light and the irradiated infrared light is reflected by the metal wire 194w of the fourth polarizer 194. The reflected visible and infrared light will return to the lighting device 200 or the image sensor 30. The light returning to the lighting device 200 or the image sensor 30 is reflected by an optical element, such as a lens, and is sent again to the fourth polarizer 194 sides. As a result, the light emitted from the lighting device 200 or the image sensor 30 can be reused.

Figure 8:
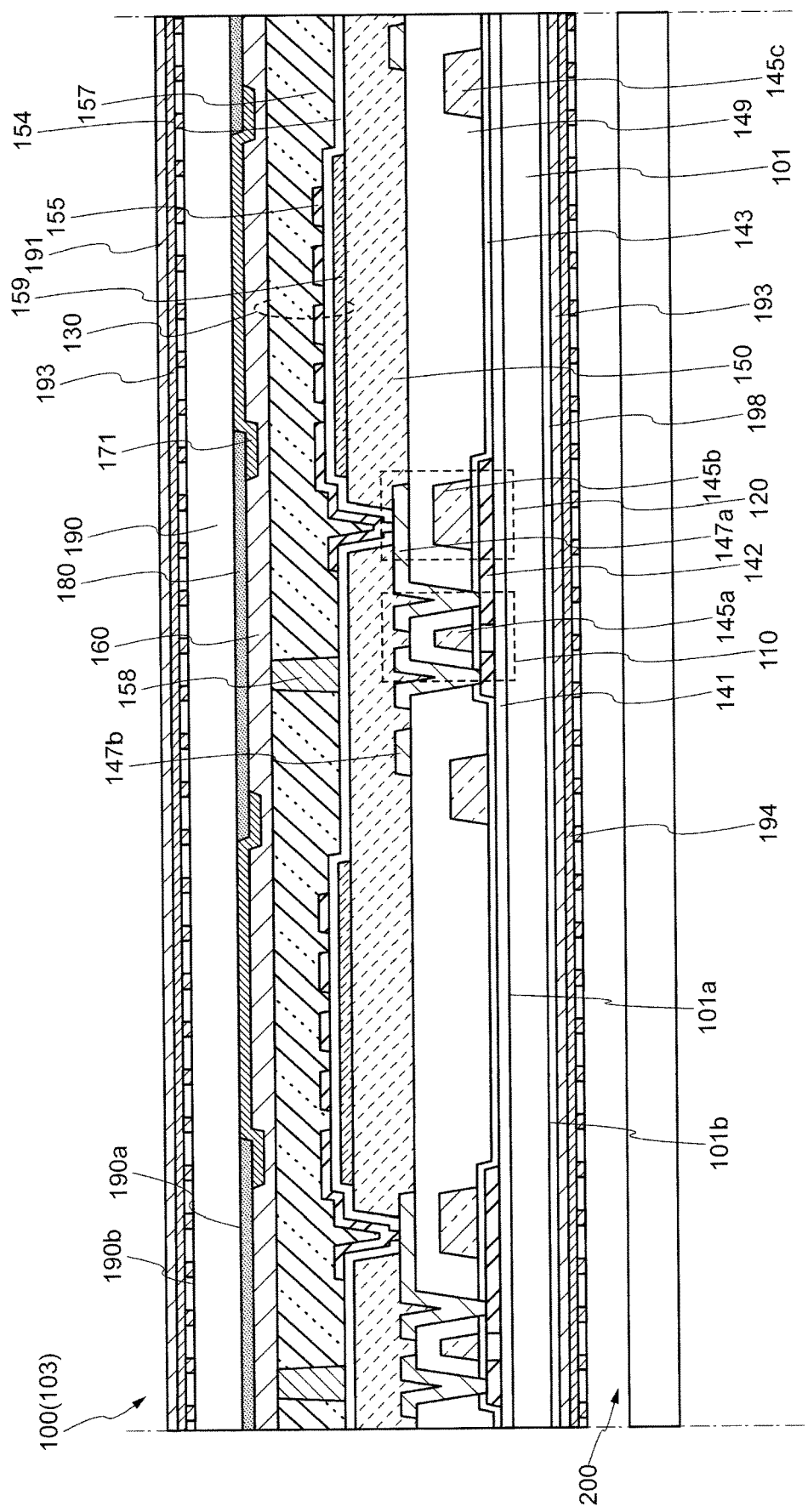
FIG. 8 is a cross-sectional view of a display device according to an embodiment of the present invention.

(1-4. Other Configurations of Display Device) Next, the configuration of the display device 20 will be described in detail using a cross-sectional view. FIG. 8 shows a cross-sectional view of the display device 20, particularly the pixel 103 provided in the display region 102 of the display panel 100. As shown in FIG. 8, the pixel 103 of the display panel 100 includes a transistor 110, a capacitive element 120, an insulating layer 141, an insulating layer 149, and a planarization layer 150 in addition to the second substrate 101, the display element 130 (the pixel electrode 155, the liquid crystal layer 157, the common electrode 159), a spacer 158, the resin layer 160, the color material 171, the light shielding layer 180, and the first substrate 190.

The transistor 110 has a semiconductor layer 142, a gate insulating layer 143, a gate electrode 145a, and a source-drain electrode 147a. The transistor 110 has a top-gate/top-contact structure, but the present invention is not limited thereto. The transistor 110 may have a bottom-gate structure or a bottom-contact structure.

In the capacitive element 120, a source or drain region of the semiconductor layer 142 and a capacitance electrode 145b are used with the gate insulating layer 143 as a dielectric.

The planarization layer 150 functions as a planarization film. The planarization layer 150 is provided on the insulating layer 149. The planarization layer 150 includes an organic resin. In this example, an acrylic resin is used for the planarization layer 150. Without being limited to acrylic resin, epoxy resin, polyimide resin, polyamide resin, polystyrene resin, polyethylene resin, polyethylene terephthalate resin or the like may be used for the planarization layer 150. A stacked layer of an organic resin and an inorganic material may be used for the planarization layer 150.

The insulating layer 141 is provided on the second substrate 101 and has a function as a base film. As a result, the impurity, typically alkaline metal, water, hydrogen, or the like can be prevented from diffusing from the second substrate 101 to the semiconductor layer 142.

The semiconductor layer 142 is provided on the insulating layer 141. The semiconductor layer 142 may be formed of a silicone, an oxide semiconductor, or an organic semiconductor, or the like.

The gate insulating layer 143 is provided on the insulating layer 141 and the semiconductor layer 142. The gate insulating layer 143 may be formed of silicon oxide, silicon oxynitride, silicon nitride, or other high dielectric constant inorganic material.

The gate electrode 145a is provided on the gate insulating layer 143. The gate electrode 145a is connected to the scan line 145c as appropriate. The gate electrode 145a and the capacitance electrode 145b are also provided on the gate insulating layer 143. The gate electrode 145a and the capacitance electrode 145b may be formed of a single-layer structure of the above-described conductive materials or may be formed of stacked structure. The gate electrode 145a, the capacitance electrode 145b, and the scan line 145c may be formed of conductive materials selected from tantalum, tungsten, titanium, molybdenum, aluminum, and the like.

The insulating layer 149 may be formed of a material similar to the gate insulating layer 143. The insulating layer 149 is provided on the gate insulating layer 143, the gate electrode 145a, and the capacitance electrode 145b. The insulating layer 149 may be a single layer or a stacked structure of the above materials.

The source-drain electrode 147a is provided on the insulating layer 149. The source-drain electrode 147a is connected to the signal line 147b as appropriate. For the source-drain electrode 147a and the signal line 147b, materials similar to those listed as examples of materials of the gate electrode 145a may be used. In this case, the same material as that of the gate electrode 145a may be used for the source-drain electrode 147a, or another material may be used.

The insulating layer 154 is provided on the planarization layer 150 and the common electrode layer 159. The insulating layer 154 be formed of a material similar to the gate insulating layer 143.

A plurality of spacers 158 is provided in the liquid crystal layer 157. The spacers 158 have a function of keeping the distance between the pixel electrode 155 and the common electrode 159, that is, the interval between the second substrate 101 and the first substrate 190. Silicon oxide which is an inorganic insulating material, or a photo spacer formed of a photosensitive resin is used for the spacer 158.

Second Embodiment

In the present embodiment, a display device different from the first embodiment will be described. Specifically, a display device in which the arrangement of the polarizer is different will be described.

Figure 9:
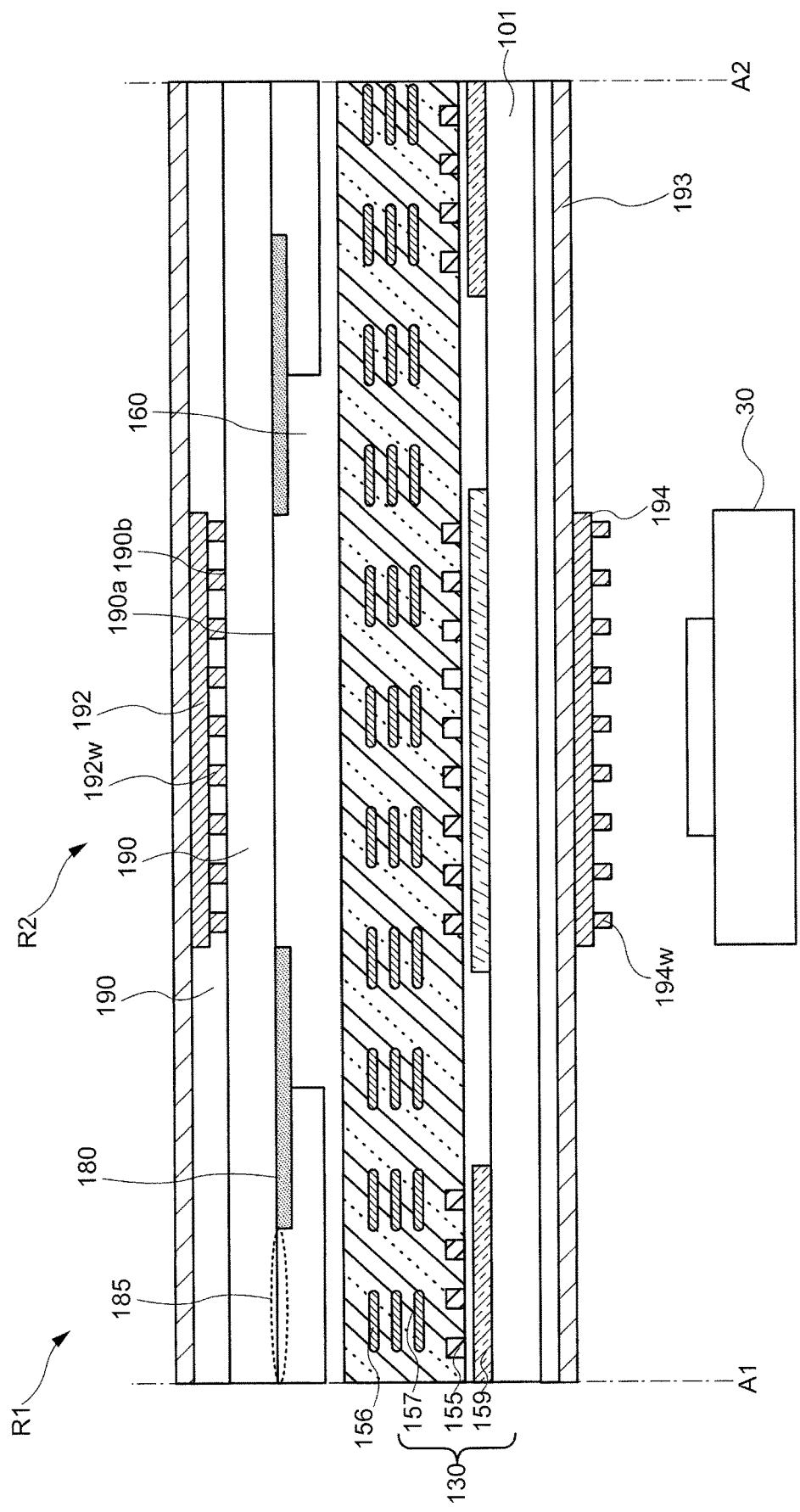
FIG. 9 is a cross-sectional view showing a display region in a display device according to an embodiment of the present invention.

FIG. 9 shows a cross-sectional view between A1-A2 of the region 100a. As shown in FIG. 9, in the present embodiment, the first polarizer 191 and the third polarizer 193 are arranged in a different region from the second polarizer 192 and the fourth polarizer 194. Specifically, the second polarizer 192 and the fourth polarizer 194 are provided so as to overlap with only the infrared light transmission region R2. The second polarizer 192 is arranged inner than the first polarizer 191 on the basis of the second surface 101b of the first substrate 190.

Figure 10:
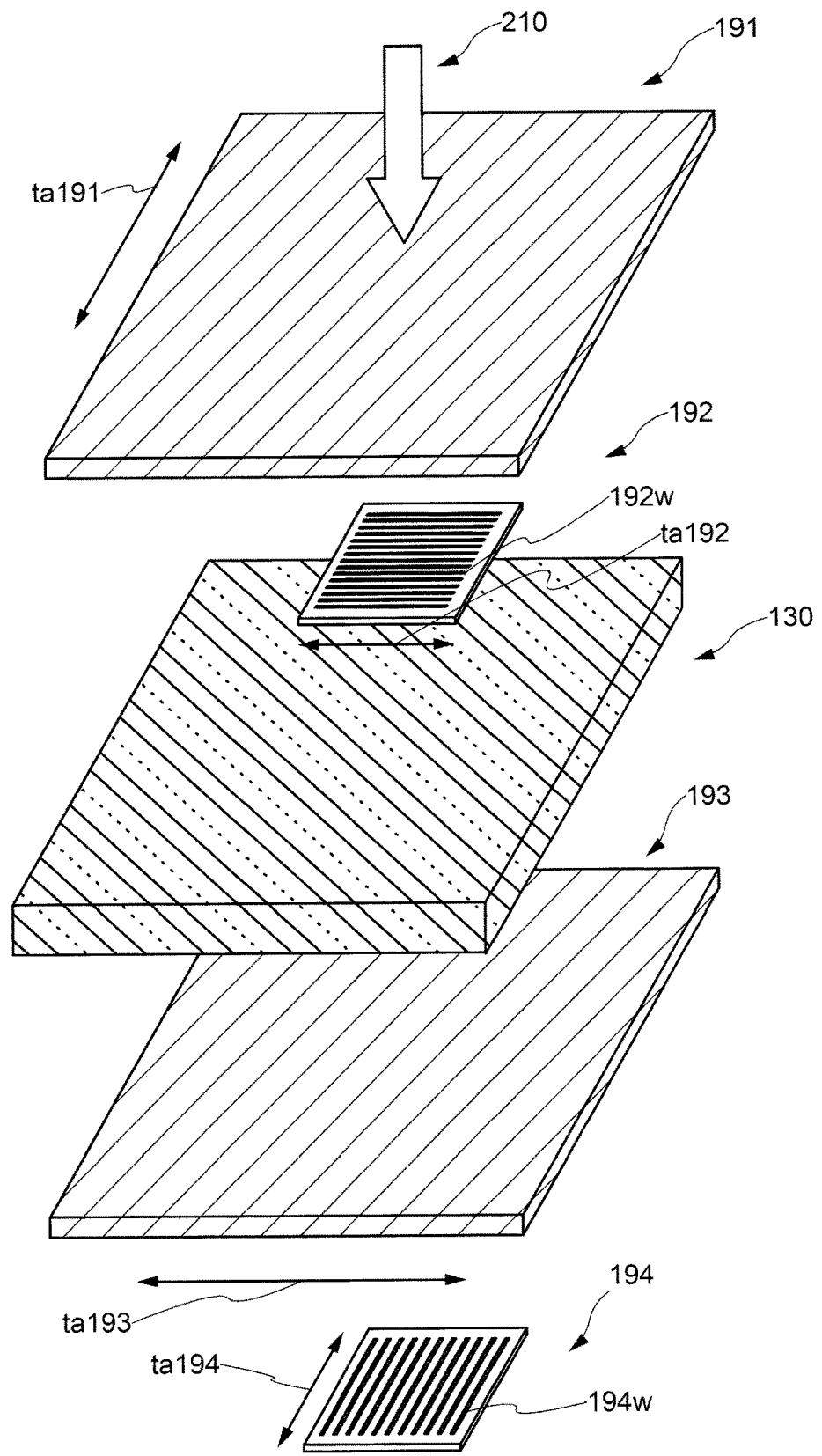
FIG. 10 is a perspective view showing a configuration of a polarizer according to an embodiment of the present invention.

FIG. 10 is a perspective view showing the configuration of the transmission axis of the polarizer. As shown in FIG. 10, the transmission axis ta191 of the first polarizer 191 and the transmission axis ta192 of the second polarizer 192 may intersect, more specifically, may be perpendicular to each other. Similarly, the transmission axis ta193 of the third polarizer 193 and the transmission axis ta194 of the fourth polarizer 194 may intersect. In this case, the transmission axis ta191 of the first polarizer 191 and the transmission axis ta193 of the third polarizer 193 via the display element 130 are perpendicular. Similarly, the transmission axis ta192 of the second polarizer 192 and the transmission axis ta194 of the fourth polarizer 194 via the display element 130 are perpendicular.

Figure 11:
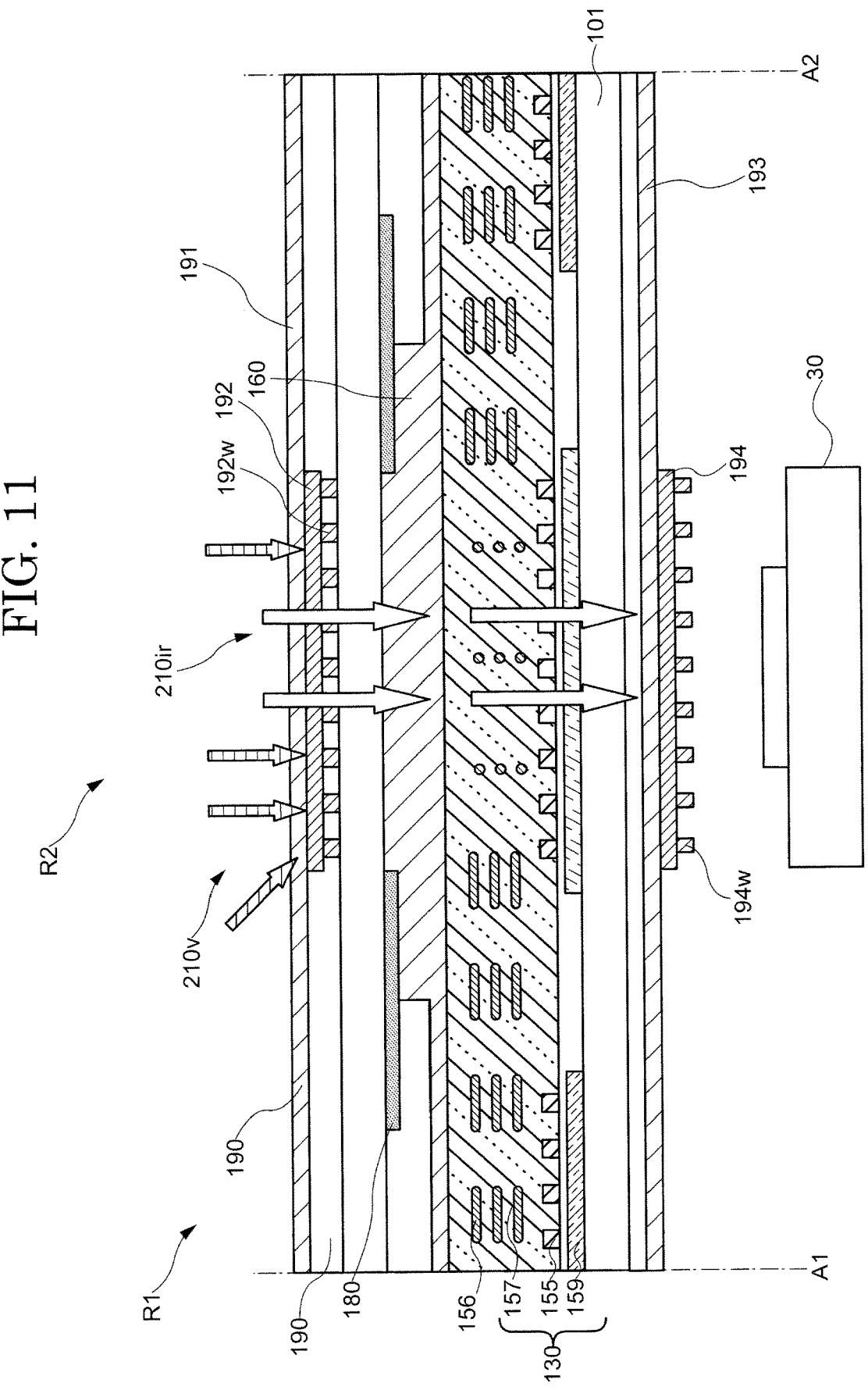
FIG. 11 is a cross-sectional view showing an example of transmission of light in a display device according to an embodiment of the present invention.

FIG. 11 shows a state in which infrared light in the infrared light transmission region R2 transmits through the display panel 100. As shown in FIG. 11, the orientation of the liquid crystal molecule 156 is controlled so as to transmit the infrared light 210ir. Specifically, the orientation of the liquid crystal molecules 156 is controlled so that the oscillation direction of the infrared light 210ir being transmitted through the second polarizer 192 is parallel to the transmission axis of the fourth polarizer 194. After the infrared light 210ir passes through the liquid crystal layer 157, the infrared light 210ir can transmit through the fourth polarizer 194. That is, the infrared light 210ir can transmit through the display panel 100. Therefore, in the infrared light transmission region R2, the second polarizer 192, and the fourth polarizer 194 can selectively transmit the light in the infrared transmission region, and the contrast ratio in the infrared light transmission region R2 can be increased.

As described above, in the present embodiment, the transmission axis ta191 of the first polarizer 191 and the transmission axis ta192 of the second polarizer 192 intersect. In this case, even if the polarization of visible light 210v is intended to be controlled by the second polarizer 192, or even if a part of the visible light 210v passes through the first polarizer 191, the visible light 210v is blocked by the second polarizer 192, and the external light reflection is prevented.

With the above-described configuration, the penetration of visible light into the infrared light transmission region R2 is suppressed in the visible second surface 190b of the first substrate 190. Therefore, in the infrared light transmission region R2, the contrast ratio to the light in the infrared region can be increased.

Since the second polarizer 192 is arranged below the first polarizer 191, it is difficult to visually recognize the metal wire 192w. Further, since the second polarizer 192 is arranged below the first polarizer 191, it is possible to further prevent reflections of outside light. Therefore, the visibility of the display panel 100 is further improved by using the present embodiment.

In the present embodiment, since the second polarizer 192 and the fourth polarizer 194 are not provided in the image display region R1, the contrast ratio to the light in the visible wavelength band can be further increased. Therefore, by using the present embodiment, it is possible to provide a display device with high display quality having a high contrast ratio in a wide wavelength band.

MODIFICATIONS

In the first embodiment of the present invention, the display device has the infrared light transmission region, but the present invention is not limited thereto. For example, light in ultraviolet region may be used as the light in the second wavelength band. In this case, the display device 20 may have an ultraviolet light transmission region. In this case, as the image sensor 30, an image sensor for receiving light in ultraviolet wavelength band is used.

In the first embodiment of the present invention, materials including metal wires are used as the second polarizer 192 and the fourth polarizer 194, but the present invention is not limited thereto. Dye-based organic resin materials may be used as the polarizer for polarizing light in infrared wavelength band.

What is claimed is:
1. An electronic device comprising;
a display device including:
a first substrate having a first surface and a second surface on the opposite side with respect to the first surface,
a second substrate having a third surface opposite the first surface and a fourth surface on the opposite side with respect to the third surface, and
a liquid crystal layer disposed between the first substrate and the second substrate,
the display device including a first region and a second region in a plan view, the first substrate including a first polarizer provided on the second surface and a second polarizer being overlapped with the second region and being stacked with the first polarizer, and the second substrate including a third polarizer provided on the fourth surface and a fourth polarizer being overlapped with the second region and being stacked with the third polarizer; and an image sensor being installed outside the display device and being overlapped with the second region.

2. The electronic device according to claim 1, wherein the second polarizer and the fourth polarizer include metal thin wires in a grid pattern.

3. The electronic device according to claim 2, wherein the second polarizer is stacked inside the first polarizer with respect to the second surface of the first substrate.

4. The electronic device according to claim 2, wherein the fourth polarizer is stacked outside of the third polarizer with respect to the first surface of the second substrate.

5. The electronic device according to claim 1, wherein the first polarizer and the third polarizer are overlapped on the first region and the second region, the second polarizer and the fourth polarizer are overlapped on the second region, and a light transmission axis in the first polarizer intersects a light transmission axis in the second polarizer.

6. The electronic device according to claim 1, wherein the first polarizer, the second polarizer, the third polarizer, and the fourth polarizer are overlapped on the first region and the second region, a light transmission axis of the first polarizer and a light transmission axis of the second polarizer are parallel, and a light transmission axis of the third polarizer and a light transmission axis of the fourth polarizer are parallel.

7. The electronic device according to claim 1, wherein the first polarizer and the third polarizer polarize light in the visible wavelength region, and the second polarizer and the fourth polarizer polarize light in the infrared wavelength region.

\* \* \* \* \*